US007457640B2

(12) United States Patent
Eddy

(10) Patent No.: US 7,457,640 B2
(45) Date of Patent: Nov. 25, 2008

(54) DIELECTRIC LOADED CAVITY FILTERS FOR NON-ACTIVELY COOLED APPLICATIONS IN PROXIMITY TO THE ANTENNA

(75) Inventor: Michael Eddy, Santa Barbara, CA (US)

(73) Assignee: Antone Wireless Corporation, Goleta, CA (US)

( * ) Notice: Subject to any disclaimer, the term of this patent is extended or adjusted under 35 U.S.C. 154(b) by 434 days.

(21) Appl. No.: 11/257,891

(22) Filed: Oct. 25, 2005

(65) Prior Publication Data

US 2006/0094471 A1 May 4, 2006

Related U.S. Application Data

(60) Provisional application No. 60/623,552, filed on Oct. 29, 2004.

(51) Int. Cl.
*H04M 1/00* (2006.01)

(52) U.S. Cl. ................ 455/562.1; 455/11.1; 455/422.1; 455/561

(58) Field of Classification Search ................. 455/561, 455/562.1, 422.1, 11.1, 19
See application file for complete search history.

(56) References Cited

U.S. PATENT DOCUMENTS

| | | | | |
|---|---|---|---|---|
| 4,453,146 | A | 6/1984 | Fiedziuszko | |
| 4,489,293 | A | 12/1984 | Fiedziuszko | |
| 4,652,843 | A | 3/1987 | Tang et al. | |
| 5,220,300 | A | 6/1993 | Snyder | |
| 5,268,659 | A | 12/1993 | Zaki et al. | |
| 5,604,925 | A * | 2/1997 | O'Malley et al. | 455/254 |
| 5,841,330 | A | 11/1998 | Wenzel et al. | |
| 5,949,309 | A * | 9/1999 | Correa | 333/202 |
| 6,094,113 | A | 7/2000 | Wenzel et al. | |
| 6,211,752 | B1 | 4/2001 | Gendraud et al. | |
| 6,212,404 | B1 * | 4/2001 | Hershtig | 455/561 |
| 6,239,673 | B1 | 5/2001 | Wenzel et al. | |
| 6,262,639 | B1 | 7/2001 | Shu et al. | |

(Continued)

OTHER PUBLICATIONS

Brochure, KMW, p. 21 (2004).

(Continued)

*Primary Examiner*—Stephen M D'Agosta
(74) *Attorney, Agent, or Firm*—Vista IP Law Group LLP

(57) ABSTRACT

A dielectric-based RF device such as a tower mounted amplifier (TMA), mast-head amplifier (MHA), or Tower Mounted Boosters (TMB) includes a housing having a plurality of cavities and an input and an output, the input being coupled to the antenna and the output being coupled to a base station. The housing includes a transmission path with a transmit filter. The housing further includes a receive path with at least one receive filter and a low noise amplifier. The receive filter includes a plurality of cavities with a dielectric-based resonator disposed in at least some of the plurality of cavities. In one aspect, the RF device has a volume of less than about 155 $in^3$. The RF device including the dielectric-based resonators has excellent out-of-band signal rejection with low loss. In addition, the RF device described herein is small enough to mount close to the antenna. The dielectric-based RF device has superior performance characteristics and a smaller footprint than conventional air cavity-based TMAs.

15 Claims, 10 Drawing Sheets

U.S. PATENT DOCUMENTS

| | | | | |
|---|---|---|---|---|
| 6,263,215 | B1 | 7/2001 | Patton et al. | |
| 6,542,049 | B2 * | 4/2003 | Henningsson et al. | 333/132 |
| 6,650,208 | B2 | 11/2003 | Karhu | |
| 6,686,811 | B2 * | 2/2004 | Hey-Shipton | 333/99 S |
| 6,946,933 | B2 | 9/2005 | Accatino et al. | |
| 2004/0108629 | A1 * | 6/2004 | Imanaka et al. | 264/614 |
| 2004/0135654 | A1 | 7/2004 | Karhu | |
| 2005/0030130 | A1 | 2/2005 | Alford | |
| 2005/0164888 | A1 | 7/2005 | Hey-Shipton | |

OTHER PUBLICATIONS

PCT International Preliminary Report for PCT/US2005/039013, Applicant: Antone Wireless Corporation, Form PCT/IB/326, dated May 10, 2007 (9 pages).

* cited by examiner

Single Coax Output

Two Coax Output

DIELECTRIC LOADED CAVITY FILTERS FOR NON-ACTIVELY COOLED APPLICATIONS IN PROXIMITY TO THE ANTENNA

RELATED APPLICATION

This Application claims priority to U.S. Provisional Patent Application No. 60/623,552 filed on Oct. 29, 2004. The above-noted Application is incorporated by reference as if set forth fully herein.

FIELD OF THE INVENTION

The field of the invention generally relates to dielectric-based filters used in wireless applications. More specifically, the field of the invention relates to cavity-based dielectric filters that are mounted or otherwise located in close proximity to the antenna. Such filters have applications in Tower Mounted Amplifiers ("TMAs") or Mast-Head Amplifiers ("MHAs"), Tower Mounted Boosters ("TMBs") or any other application using dielectric filters close to the antenna such as, for example, remote RF applications, and repeater applications.

BACKGROUND OF THE INVENTION

As mobile usage increases, wireless service providers are increasingly faced with the challenge of optimizing and/or expanding their wireless networks to provide better service for their customers while also minimizing their network capital expenditures. TMAs (or MHAs) and TMBs are currently being used extensively in wireless networks to improve the range of cellular base stations. Generally, a TMA or MHA consists of a filter and low noise amplifier ("LNA") which is mounted at or near the top of a base station tower. TMAs and MHAs improve signal quality by boosting the uplink (Rx) signal of a mobile system immediately after the antenna. TMAs and MHAs compensate for the loss in signal that occurs in the coaxial cable run from the antenna to the base transceiver station ("BTS"). The goal of TMAs and MHAs is to amplify the in-band signal close to the antenna so as to provide the lowest possible noise contribution to the overall receiver system. TMAs and MHAs can result in increased coverage area for a given base station. This allows mobile subscribers to place more calls, place longer calls, increase data throughput, as well as reduce the number of dropped calls. This also reduces the overall number of base stations required to cover a specific area, hence, minimizing overall capital expenditures.

TMAs or MHAs have become increasingly used as wireless carriers move to higher frequencies (i.e., greater than about 1.5 GHz) because RF propagation is much shorter at these frequencies (as compared to ~850 MHz—the initial deployment frequency of cellular in the United States) and ~900 MHz (initial deployment frequency in Europe). TMAs or MHAs are typically overlaid on top of existing base station infrastructure in order to avoid the high cost to site and construct additional base station towers. Current TMAs or MHAs rely on air-filled, cavity-based filters which can have low loss but poor filtering characteristics or good filtering characteristics and high loss. It is important, however, to reduce out-of-band signals as much as possible because signals passing through the filters will be amplified and passed to the BTS. This is particularly important because the presence of out-of-band interfering signals will produce additional noise in the system because of harmonics generated within the non-linear components such as the LNA and mixers.

The problem is that in order to mount the LNA as close as possible to the antenna, the filter in the TMA or MHA must necessarily be small because of the limited space or "real estate" at the top of the tower. In current air cavity-based filters, this necessitates poor filtering performance. While high performance cavity filters are available, their large size and increased loss precludes them from being used in close-to-the antenna applications (e.g., in TMA or MHA systems).

Thus, there is a need for filter (or TMA/MHA) that provides excellent out-of-band signal rejection with low loss, yet is small enough to mount close to the antenna. Preferably, the filter can be incorporated into TMAs or MHAs which can be overlaid on existing tower infrastructure for use in 2 GHz (or higher) applications.

In addition, there is a growing need for better filtering in newer (3G) air interfaces such as CDMA and OFDM. This need for better filtering comes from the fact that on CDMA and OFDM wireless networks, any interference has a significant impact on the receiver performance, unlike earlier protocols such as analog, TDMA or GSM. Furthermore, data services are becoming increasingly important to wireless carriers. Unfortunately, data is much less forgiving than voice with respect to errors. Also, filter performance is critical on the transmit side because the signal is amplitude modulated. The power amplifier design is much more complex and is limited by the out of the band emissions at maximum power. This can, however, be reduced with good filtering. Thus, newer technologies being implemented in wireless networks are driving the need for good filtering on both the transmit and the receive side of the network.

SUMMARY OF THE INVENTION

In one aspect of the invention, a radiofrequency (RF) device (e.g., TMA, MHA, TMB )adapted for coupling to an antenna includes a housing having a plurality of cavities and an input and output, the input being coupled to the antenna, the output being coupled to a base station (BTS). A transmission path is provided within the housing and includes a transmit filter. A receive path is provided within the housing and includes at least one receive filter and a low noise amplifier, the receive filter including a plurality of cavities with a dielectric-based resonator disposed in at least some of the plurality of cavities. The dielectric-based resonators may be disposed in all or fewer than all the cavities formed within the receive filter portion of the housing. In one aspect, the RF device has a volume of less than 155 $in^3$ and is mounted adjacent or near the antenna.

In certain embodiments, the RF device is mounted within ten feet of the antenna. In still other aspects, the RF device may be mounted within five or three feet or less of the antenna.

In another aspect of the invention, a RF device adapted for coupling to an antenna includes a housing having a plurality of cavities and an input and an output. The input is coupled to the antenna while the output is coupled to a BTS. The housing includes a transmission path with at least one transmit filter. The housing further includes a receive path that includes at least one receive filter and a low noise amplifier. The at least one receive filter includes a plurality of cavities, wherein the cavity closest to the input of the receive filter includes a metal resonator and the cavity closest to the output of the receive filter also includes a metal resonator. The remainder of the cavities of the receive filter each contain a dielectric-based filter resonators.

In one aspect, the RF device described immediately above has a size of less than 155 $in^3$ and is mounted adjacent or near the antenna. In certain embodiments, the RF device is mounted within ten feet of the antenna. In still other aspects, the RF device may be mounted within five or three feet (or less) of the antenna.

In another aspect, a method of improving the range of a cellular base station includes the steps of: providing a RF device that includes a housing having a plurality of cavities and an input and output, the input being coupled to the antenna and the output being coupled to the base station. The housing further includes a transmission path within the housing that includes a transmit filter. The housing also includes a receive path within the housing that includes at least one receive filter and a low noise amplifier. The receive filter includes a plurality of cavities with a dielectric-based resonator disposed in at least some of the plurality of cavities. The RF device is mounted on a tower (or other elevated structure) in a location that is near or adjacent to the antenna (e.g., less than 10 feet from the antenna). The antenna is then coupled the RF device and the RF device is coupled to the BTS.

The RF device described herein may be implemented using either single-mode or multi-mode dielectric-based resonators.

It is an object of the invention to provide a high performance yet small-sized TMA/MHA/TMB that utilizes dielectric-based filters. The TMA/MHA/TMB is mounted close to the antenna to reduce insertion loss. The incorporation of dielectric resonators into the RF device provides high performance (e.g., low loss and excellent filtering capabilities) in a small size that is readily amenable for mounting close to the antenna—a location where size and weight is at a premium. Further features and advantages will become apparent upon review of the following drawings and description of the preferred embodiments.

DETAILED DESCRIPTION OF THE PREFERRED EMBODIMENTS

Figure 1:
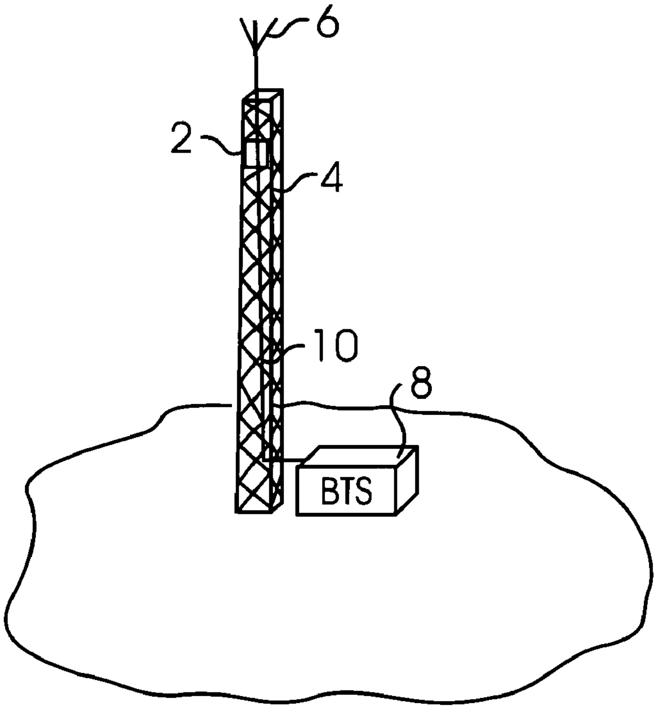
FIG. 1 illustrates a RF device such as a TMA mounted atop an elevated structure such as a tower, close to the antenna.

FIG. 1 illustrates a typical layout for an RF device 2 (e.g., TMA, MHA, TMB) (referred to herein as TMA). The TMA 2 is disposed on a tower 4 or other elevated structure adjacent to an antenna 6. The TMA 2 is coupled to the antenna 6 and a base station (BTS) 8 via coaxial cable 10. The TMA 2 may be powered by a separate power line (not shown) or, alternatively, the low noise amplifier (LNA) and any other electronics may be powered through current provided in the coaxial cable 10. In one aspect, the TMA 2 is located on the tower 4 within 10 feet of the antenna 6. In still other embodiments, the TMA 2 is located within 5 or even less than 3 feet of the antenna. The closer the TMA 2 is positioned adjacent to the antenna 6, the smaller the insertion loss created by the cabling connecting the TMA 2 to the antenna 6.

In another alternative aspect of the invention, the RF device 2 is integrally formed with the antenna 6. For example, the RF device 2 and antenna 6 may be included in a single housing or unit.

Figure 2A:
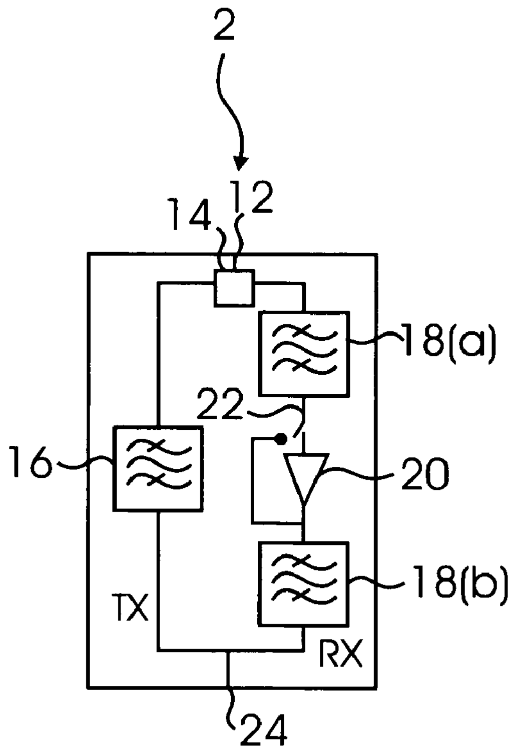
FIG. 2A illustrates a dual-duplex configuration of a TMA according one aspect of the invention.
Figure 2B:
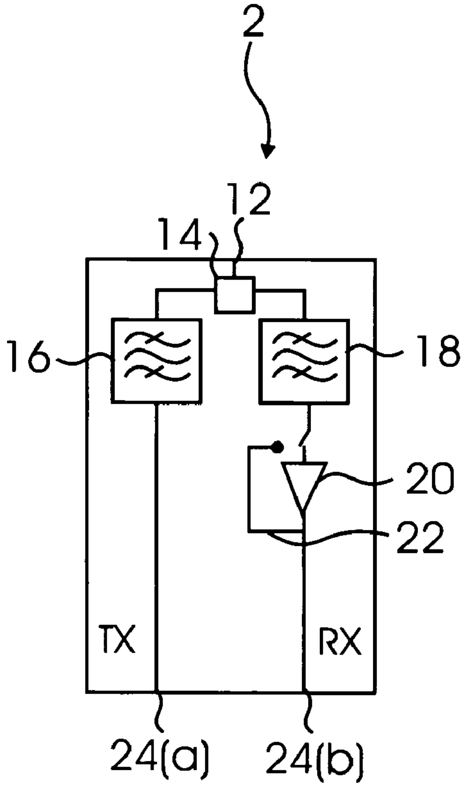
FIG. 2B illustrates a single-duplex configuration of a TMA according to another aspect of the invention.

FIGS. 2A and 2B illustrate two different configurations for a TMA 2 which can be used in accordance with the present invention. FIG. 2A illustrates a dual-duplex configuration which includes a single input 12 which passes through a lightening protection device 14. This can be incorporated into the design of the duplexer filter. The TMA 2 includes a transmit (Tx) side which includes a transmit filter 16, which may include a bandpass filter as is shown in FIG. 2A. In one embodiment of the invention, the transmit filter 16 may include a multi-pole, metal resonator-based filter. The TMA 2 also includes a receive (Rx) side which includes two receive filters 18(*a*), 18(*b*). In one aspect, one of the two receive filters 18(*a*), 18(*b*) is formed from a dielectric-based filter (described in more detail below). The remaining filter (either 18(*a*) or 18(*b*)) is formed from as a multi-pole, metal-based filter. The dielectric-based filter 18(*a*)/18(*b*) may be located before or after the LNA 20.

Still referring to FIG. 2A, the LNA 20 is interposed between filters 18(*a*) and 18(*b*). The typical gain on LNA 20 can vary from about 2-40 dB but is more typically between about 12 dB and 33 dB. The LNA 20 preferably includes a bypass switch 22 in the event the LNA 20 fails. In this regard, the BTS 8 is still able to receive signals, albeit at a lower level. The TMA 2 shown in FIG. 2A terminates at a coax output 24 which is coupled to a coax cable (not shown) which then runs down the length of the tower 4 to the BTS 8.

FIG. 2B illustrates single-duplex configuration of a TMA 2 according to an alternative configuration. As seen in FIG. 2B, the TMA 2 includes a single input 12 which passes through a lightening protection device 14. The TMA 2 includes a transmit (Tx) side which includes a transmit filter 16, preferably a bandpass filter as is shown in FIG. 2B. In one embodiment of the invention, the transmit filter 16 may include a multi-pole, metal resonator-based filter. The receive (Rx) side of the TMA 2 includes a receive filter 18, preferably in the form of a bandpass filter. In one aspect, the receive filter 18 is formed from a dielectric-based filter (described in more detail below). In the configuration shown in FIG. 2B, the LNA 20 is disposed after the receive filter 18. A bypass switch 22 is used in the case of LNA 20 failure. The configuration shown in FIG. 2B has a two coax output 24(*a*) (Tx) and 24(*b*) (Rx).

Figure 3:
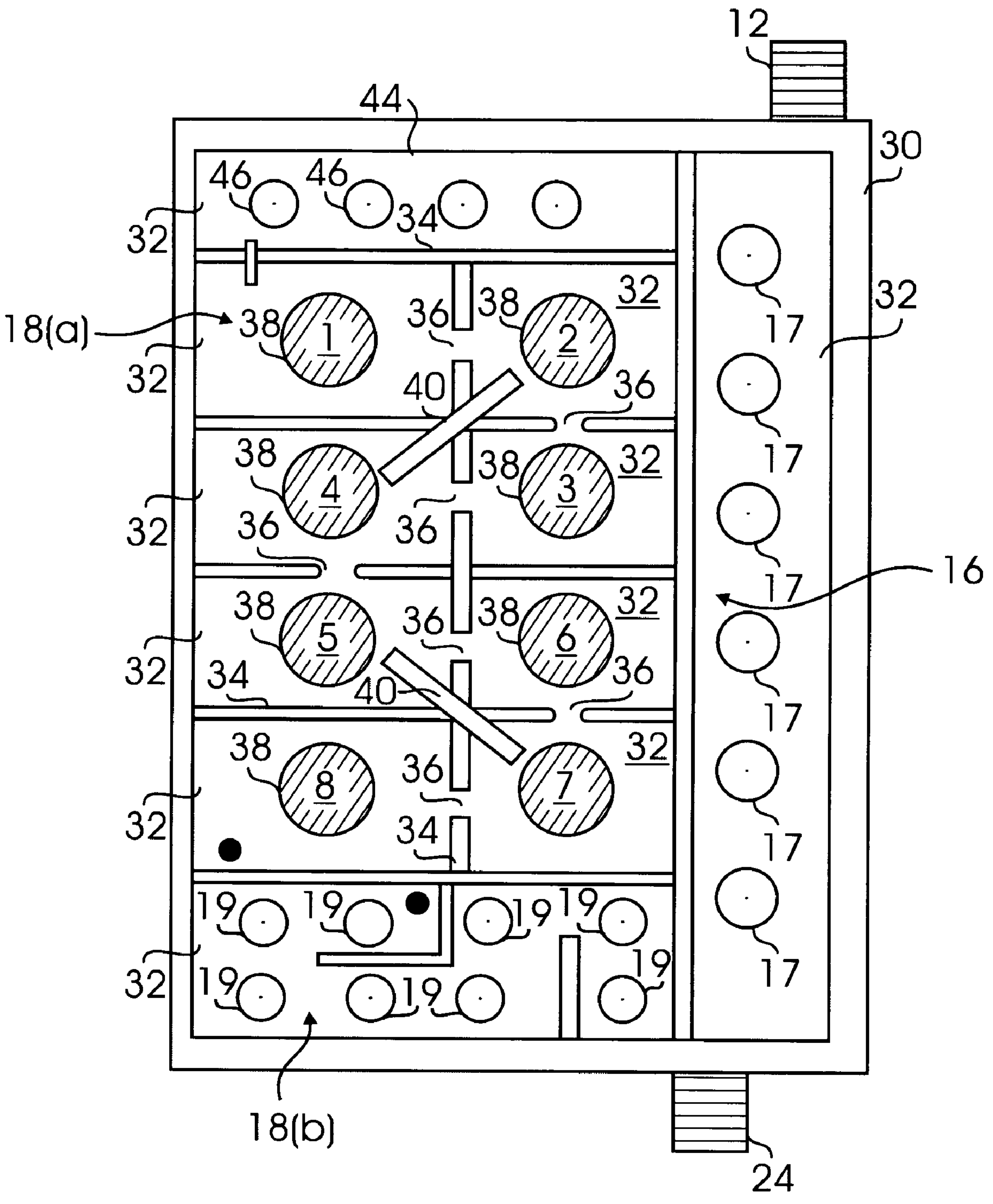
FIG. 3 illustrates a plan view (with top plate removed) of a TMA having a transmit filter and two receive filters—one of which is a dielectric-based filter.
Figure 6:
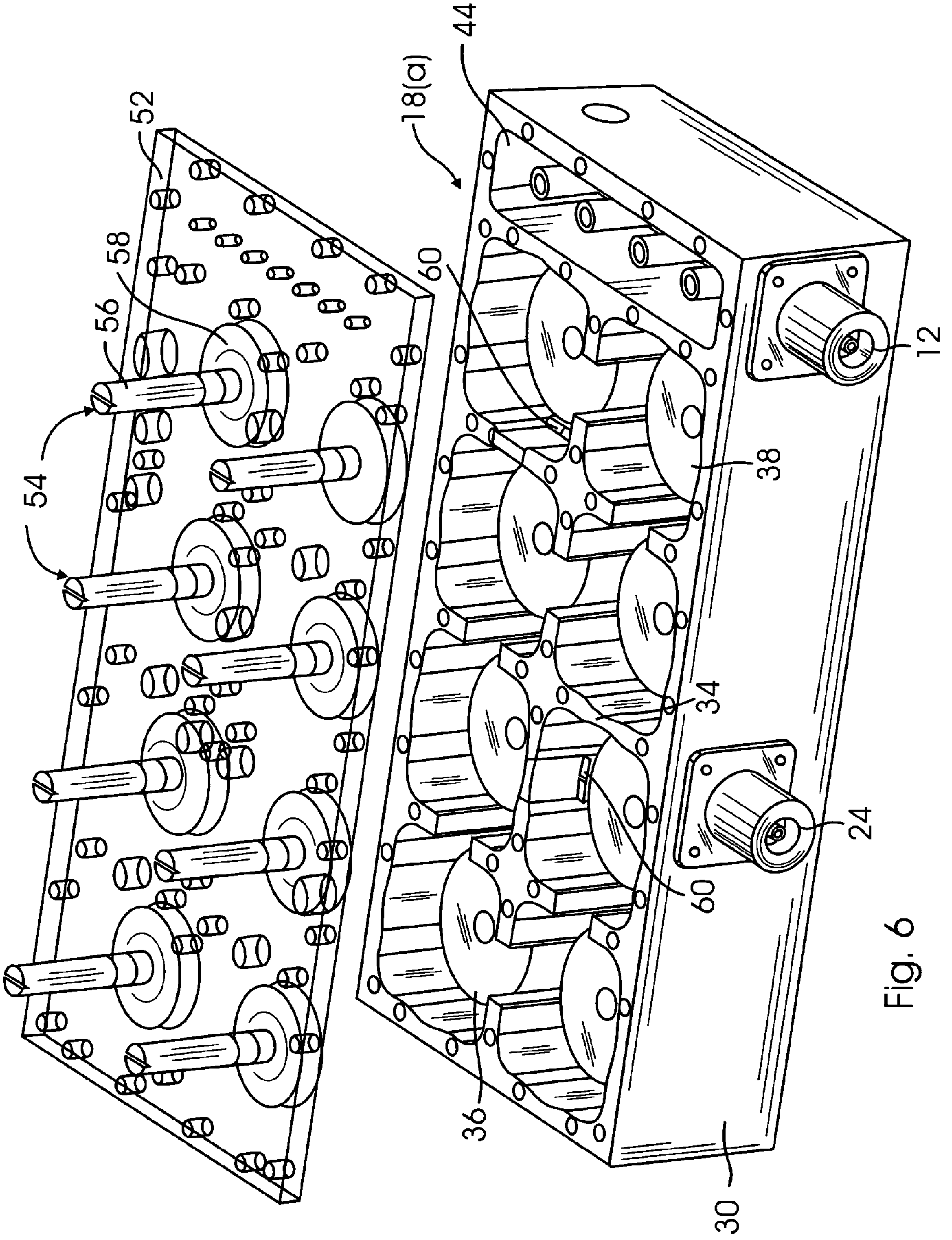
FIG. 6 illustrates a partial exploded view of a receive filter showing a plurality of tuning members located in a cover member or plate.
Figure 12:
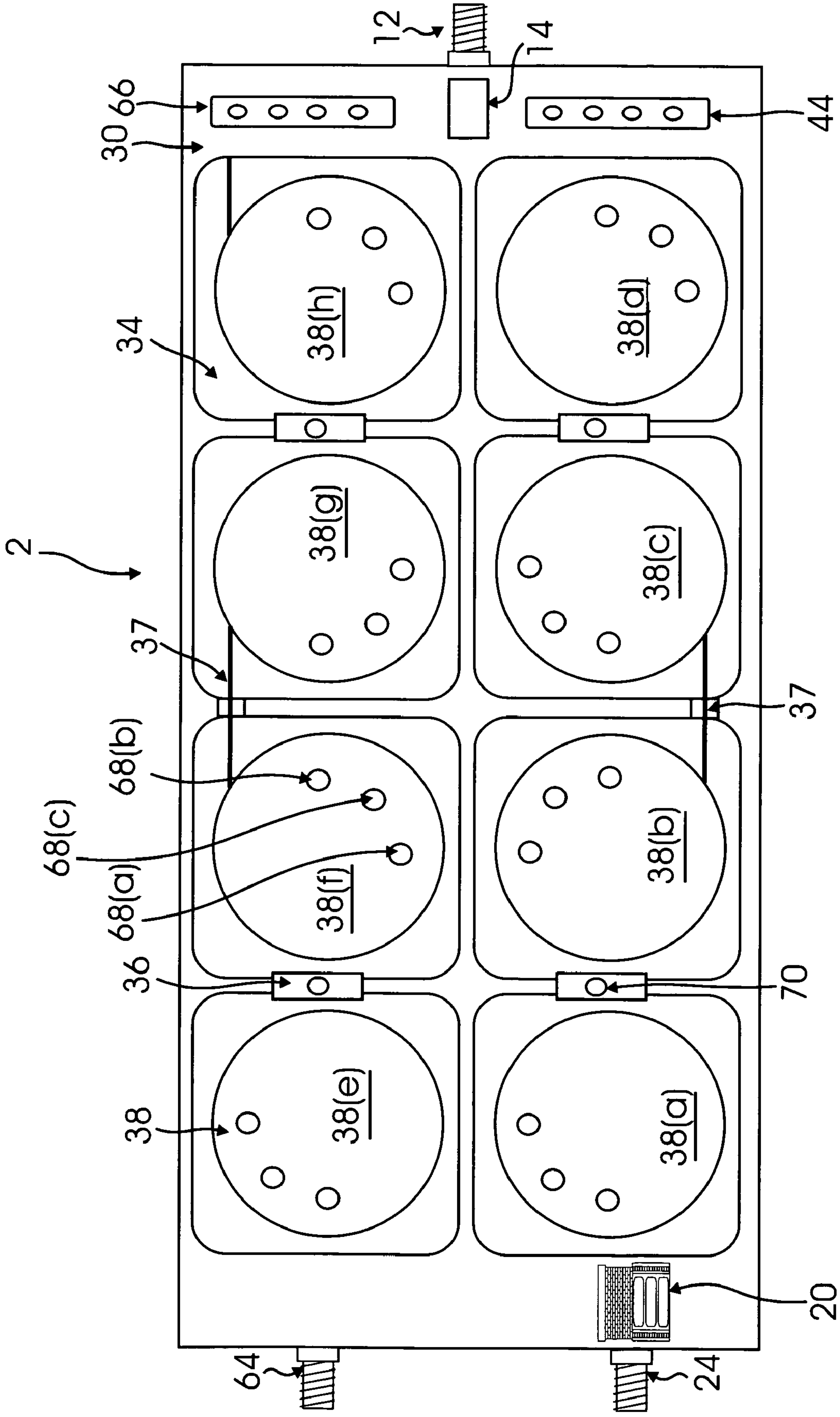
FIG. 12 illustrates the configuration of a multi-mode, dielectric-based receive filter usable in a TMA according to one embodiment.

For the configuration illustrated in FIG. 2B, two runs of coax cable (not shown) run down the length of the tower 4 to the ground-based BTS 8. For the dielectric-based filter in either the Tx and Rx paths a wide bandwidth, "clean-up" filter 44 (as illustrated in FIGS. 3, 6, and 12) may also be incorporated to attenuate unwanted modes generated within the dielectric resonators 38. Careful design of the "clean-up" filters 44 is generally required to provide the required attenuation of the unwanted modes while adding the lowest loss possible.

FIG. 3 illustrates a TMA 2 according to one embodiment. The TMA 2 includes a housing 30 having a plurality of cavities 32. The housing 30 includes a single input 12 and single output 24 which connects to corresponding ends of coaxial cable connecting to the antenna 6 and BTS 8, respectively. The housing 30 may be formed from a metal such as, for example, aluminum. The cavities 32 or open regions are formed by a series of walls 34 or partitions that generally separate the cavities 32 from one another. Certain portions of the walls 34 have open regions or irises 36 (described in more detail below) to permit coupling between resonators.

Referring to FIGS. 2A, 2B, and 3, the TMA 2 illustrated in FIG. 3 has a transmission path that includes a transmit filter 16. The transmission path generally allows a transmit path permitting signals to be sent from the BTS 8 to a user at the appropriate frequency. The housing 30 also includes a receive path that includes two receive filters 18(*a*), 18(*b*). As seen in FIG. 3, the transmit filter 16 is formed from a multi-pole (e.g., six pole) metallic rod (e.g., aluminum or a combination of different metals) resonators 17. However, the transmit filter 16 may include one or more dielectric resonators 38 as described in more detail below. Receive filter 18(*a*) is formed with a plurality of cavities 32 (eight as shown in FIG. 3), with each cavity 32 of the receive filter 18(*a*) containing a dielectric-based resonator 38. The receive filter 18(*a*) shown in FIG. 3 is an eight-pole receive filter 18(*a*) in which coupling between adjacent resonators 38 is accomplished via irises 36. Non-adjacent coupling between resonator numbers 2-4 (FIG. 3) and 5-7 is accomplished by use of metallic rods 40 (e.g., brass or aluminum) that pass through or within grooves (or irises) formed between non-adjacent cavities 32.

In one preferred aspect, the dielectric-based resonators 38 are formed from a dielectric material having a dielectric constant of at least 20. The material used may include titanate-based, niobate-based, or tantalate (BZT)-based dielectric materials. Examples of materials usable in the dielectric-based resonators 38 include Series Nos. 8300, 4300 and 4500 dielectrics available from Trans-Tech, Inc., 5520 Adamstown Road, Adamstown, Md. 21710. There are several choices for dielectric materials with the trade-offs being size (dielectric constant), rejection (Q), and cost.

Figure 4:
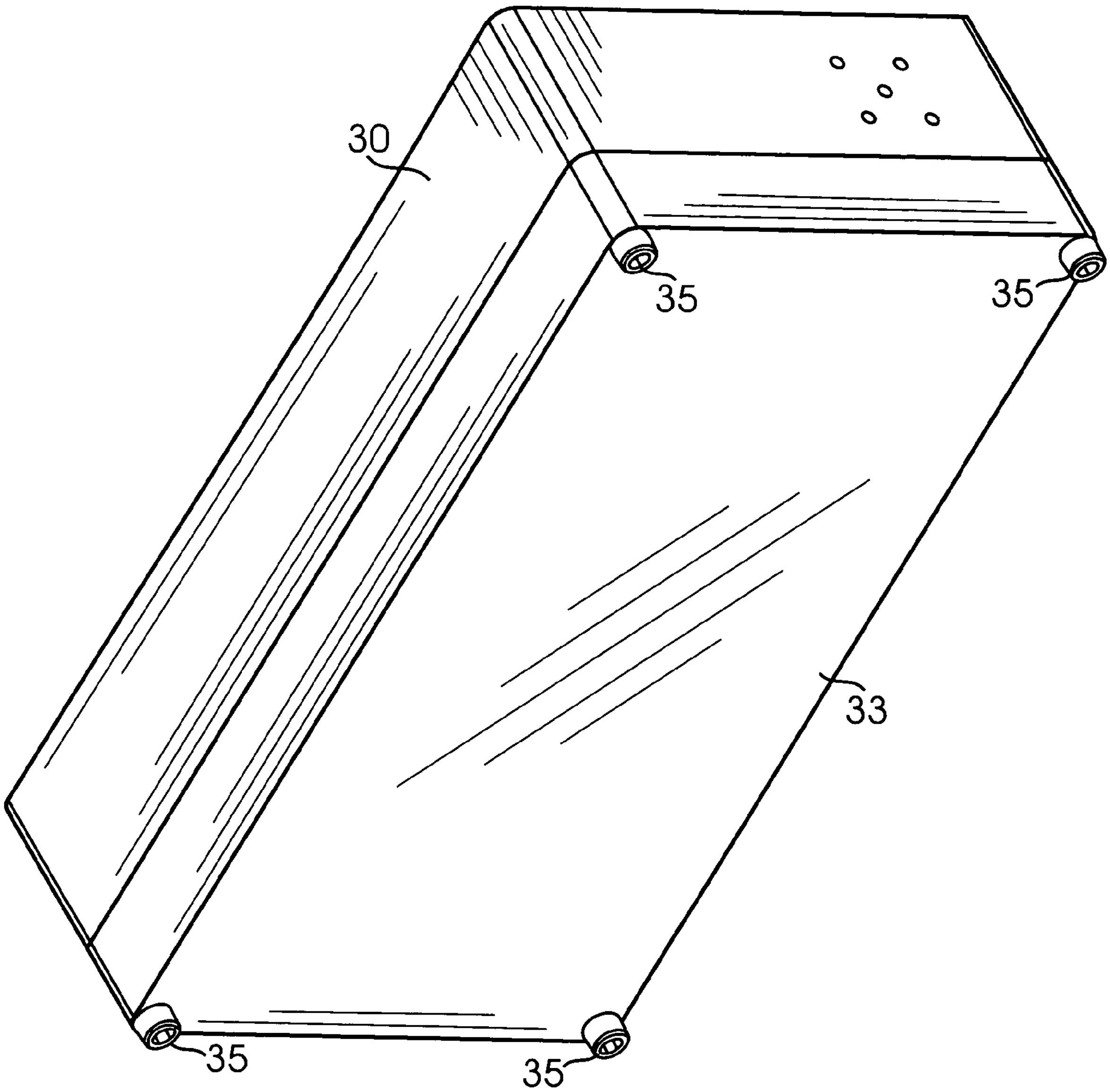
FIG. 4 illustrates a perspective view of a TMA with a cover plate enclosing the housing.

FIG. 4 illustrates the device 2 with the housing 30 fully enclosed. A cover plate 33 or the like is secured to the housing 30 via a plurality of fasteners 35 such a bolts or screws.

Figure 5:
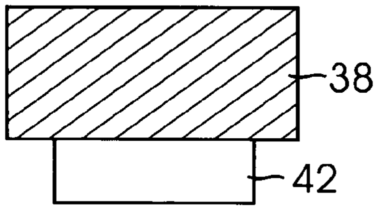
FIG. 5 illustrates a side view of a single dielectric resonator (e.g., puck) which can be used in a receive filter.

As best seen in FIGS. 3 and 5, the dielectric-based resonators 38 may be round or cylindrical in shape and mounted to the housing 30 via a low dielectric constant electrical insulator 42 such as alumina. FIG. 5 illustrates a side view of one resonator 38 coupled to the electrical insulator 42. While the resonator 38 illustrated in FIGS. 3 and 5 are circular in shape, it should be understood that other geometries are contemplated.

Referring back to FIG. 3, a clean-up filter 44 is provided in the receive path prior to receive filter 18(*a*). The clean-up filter 44 may include cylindrical or rod shaped metallic resonators 46. The Rx clean-up filter 44 is provided to clean-up spurious signals prior to transmission to the BTS 8 or the LNA 20. The second receive filter 18(*b*) is formed from a plurality of multi-pole (e.g., eight) metallic rod resonators 19. Interposed between the first and second receive filters 18(*a*), 18(*b*) is an LNA 20 (not shown in FIG. 3). The LNA 42 amplifies signals-down to the BTS 8. The LNA 20 receives its input and transmits the output signal via two coupling posts 48, 50 respectively located in the housing 30. For example, the LNA 20 may be disposed on an intermediate layer or cover (not shown in FIG. 3) which electrically contacts the two coupling posts 48, 50. In this regard, the LNA 20 is isolated away from the cavities 32 contained in the housing 30. A lightening arrestor 14 may be provided (see FIGS. 2A, 2B) to prevent or minimize damage that might arise in the event of a lightening strike. The TMA 2 includes an Rx output connector 24 which is coupled to a coax cable 10 (as shown in FIG. 1) which runs to the BTS 8 as described above.

FIG. 6 illustrates a perspective view of a receive filter 18(*a*) sub-component having a cover plate 52 removed. The cover plate 52 includes a plurality of tuning members 54. In one aspect, the tuning members 54 include a rotatable screw 56 projecting through the surface of the cover plate 52. One end of the screw 56 is affixed to a tuning body 58 which upon rotation of the screw 56, is either advanced toward or away from the adjacent resonator 38. In still other embodiments, the tuning member 54 may simply comprise a rotatable screw 56 or the like. FIG. 6 further illustrates conductive members 60 used to cross-couple resonators 38 located in different cavities 32.

Figure 7:
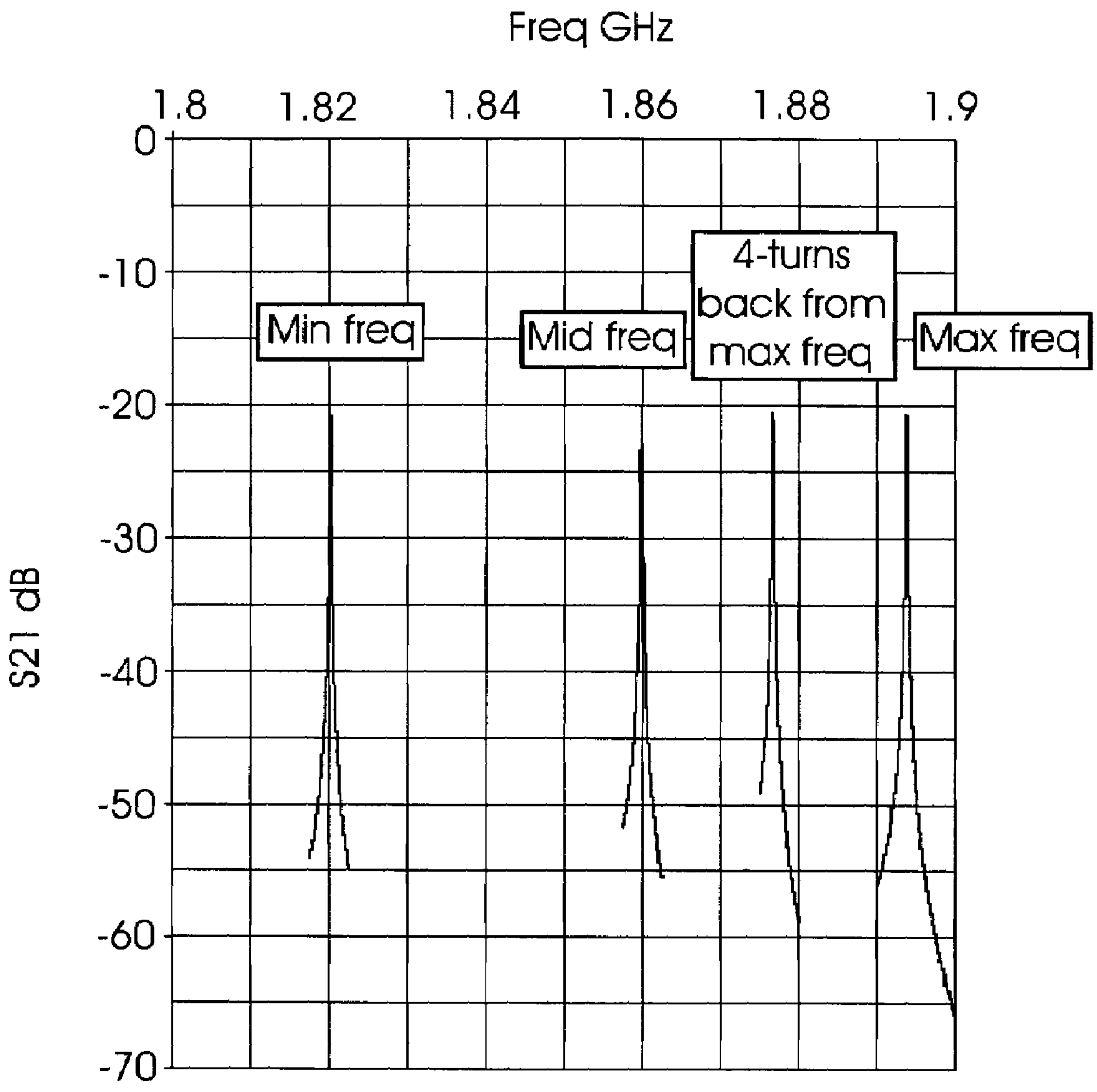
FIG. 7 illustrates the tuning response of a single mode dielectric-based resonator.

One unexpected benefit of the dielectric-based TMA device 2 when using dielectric tuning elements is that the receive filter 18 can be tuned over a wide range of frequencies without degradation in performance. FIG. 7, for example, illustrates the tuning response of a single mode dielectric-resonator. As seen in FIG. 7, there is no significant change in Q over a 72 MHz tuning range. In one aspect, the receive filter 18 may be tunable over a frequency range of about ±/ −2.5% or ~100 MHz. This is particularly important since each filter 18 must be tuned to its nominal frequency after assembly.

Figure 8:
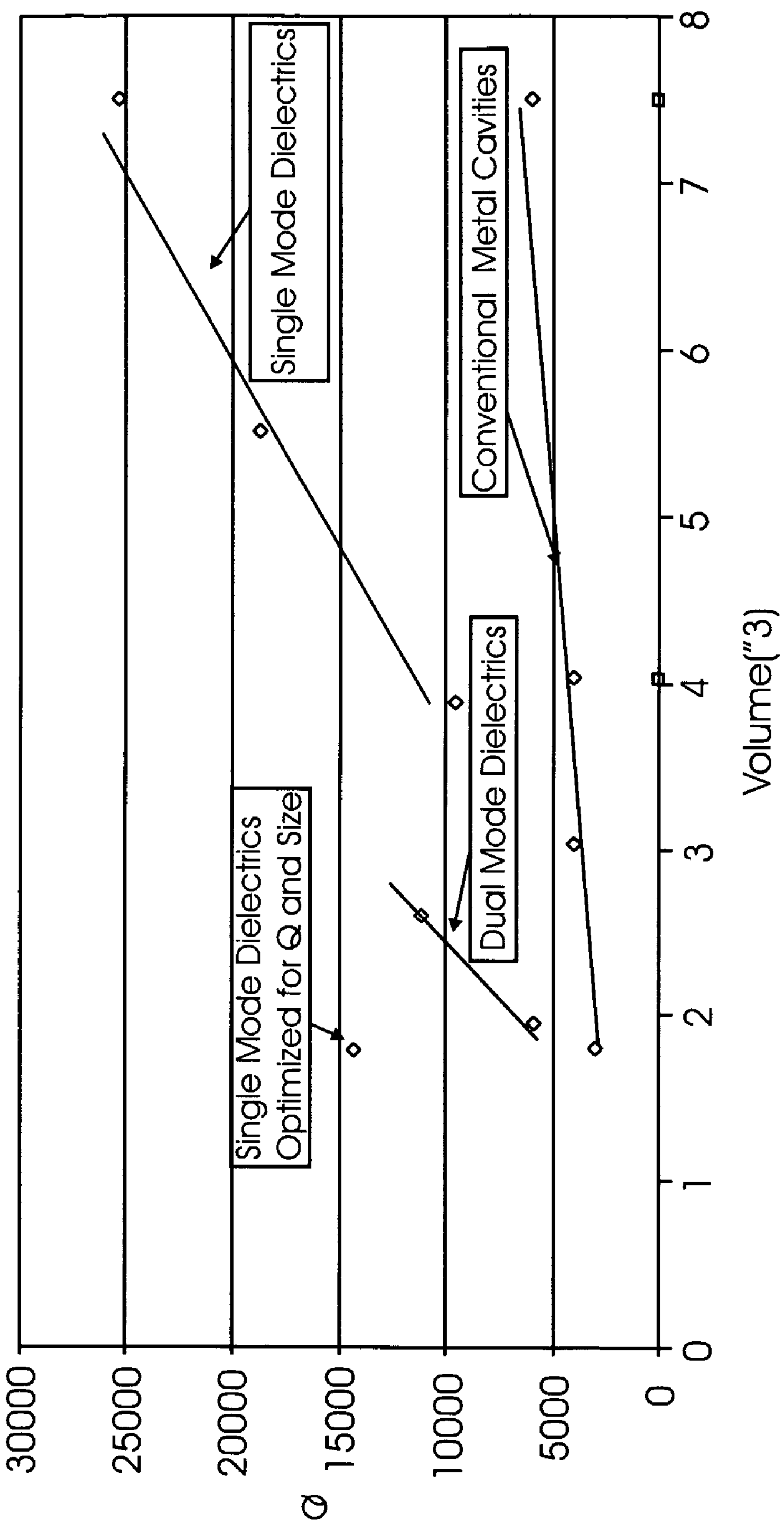
FIG. 8 illustrates a graphical representation of Q vs. volume for various types of filters (single mode dielectric-based filters (standard and those optimized for Q and size), dual mode dielectric-based filters, and conventional metal cavity filters).

In one embodiment, the overall volume of the TMA device 2 is less than about 155 $in^3$ and more preferably, less than about 100 $in^3$ while at the same time the TMA device 2 has performance characteristics not achievable with conventional cavity filters. FIG. 8 illustrates a graphical representation of Q vs. volume for various types of filters (single mode dielectric-based filters (standard and those optimized for Q and size), dual mode dielectric-based filters, and conventional metal cavity filters). The TMA devices 2 described herein have a small volume or footprint and high Q values.

In addition, in one embodiment, the TMA 2 has better than 10 dB rejection, and more preferably has better than 20 dB or even better than 30 dB rejection 1 MHz from the band edge for a 10 MHz bandwidth filter. Moreover, this performance may be maintained over a wide operating temperature range (e.g., passband moving less than 100 kHz over a temperature range from −20° C. to 60° C.). This performance may be maintained while keeping centerband loss less than 1.5 dB for a 10 MHz bandwidth. The TMA 2 can be implemented in a wireless network implementing protocols such as TDMA, CDMA, OFDM, or TDD. Preferably, the TMA 2 can be used in networks operating a frequencies exceeding 1.5 GHz, or even 2 GHz.

Figure 9:
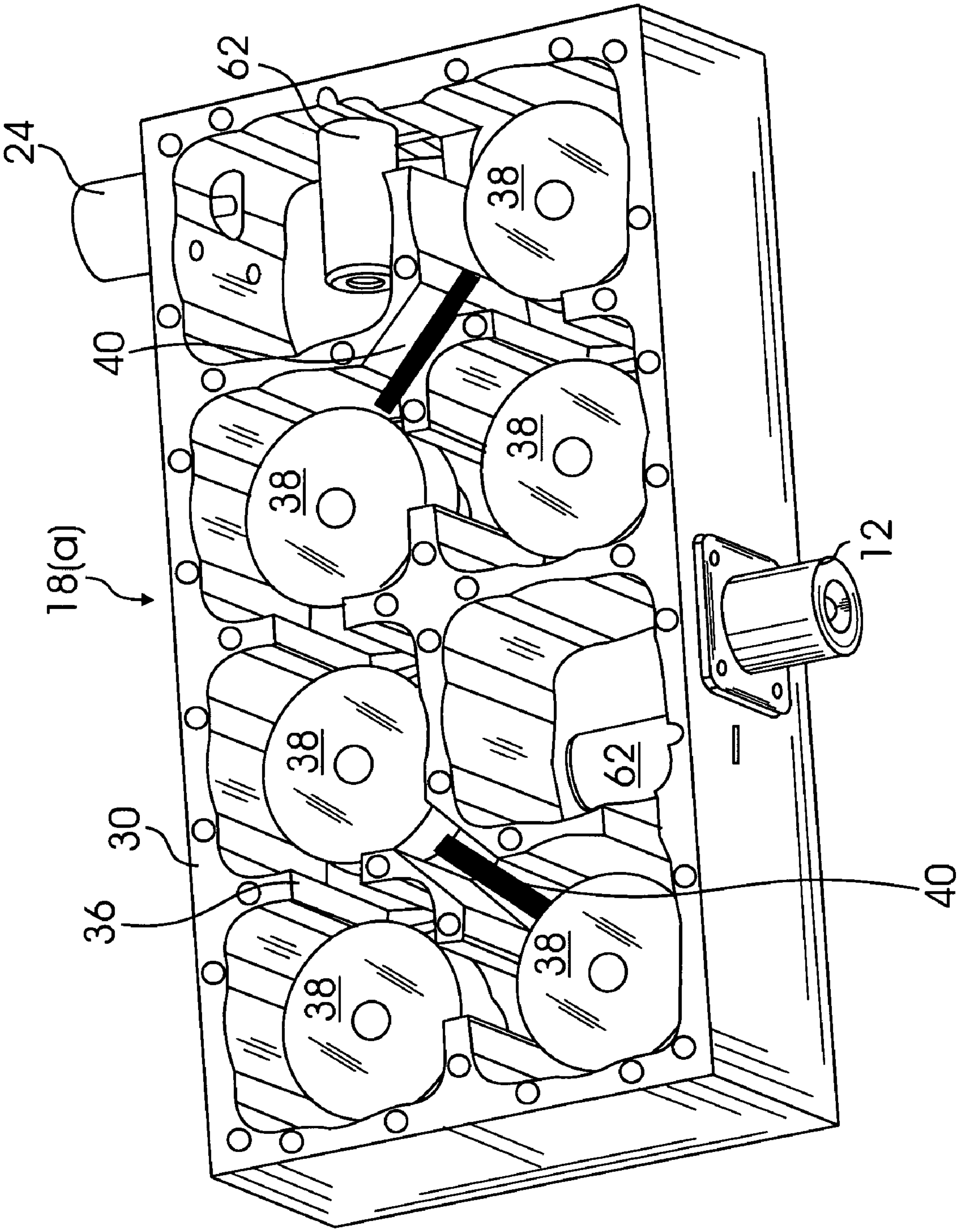
FIG. 9 illustrates a perspective view of a hybrid receive filter incorporating metal and dielectric-based resonators. Metallic resonators are located at the first and last positions to reduce the spurious to acceptable levels.

FIG. 9 illustrates a perspective view of an alternative receive filter 18(*a*) having a cover plate (not shown) removed. This filter 18(*a*) may be used in wide band applications (e.g., greater than 30 MHz). In this embodiment, cylindrical or rod-like metal resonators (e.g., aluminum, or silver-plated aluminum) 62 are placed in the first and last cavities 32. The configuration illustrated in FIG. 9 is thus a hybrid design incorporating both dielectric-based resonators 38 and conventional, metallic-based resonators 62. As seen in FIG. 9, there is no need for a clean-up filter. The metal resonators 62 at positions one and eight reduce the spurious to acceptable levels.

Figure 11:
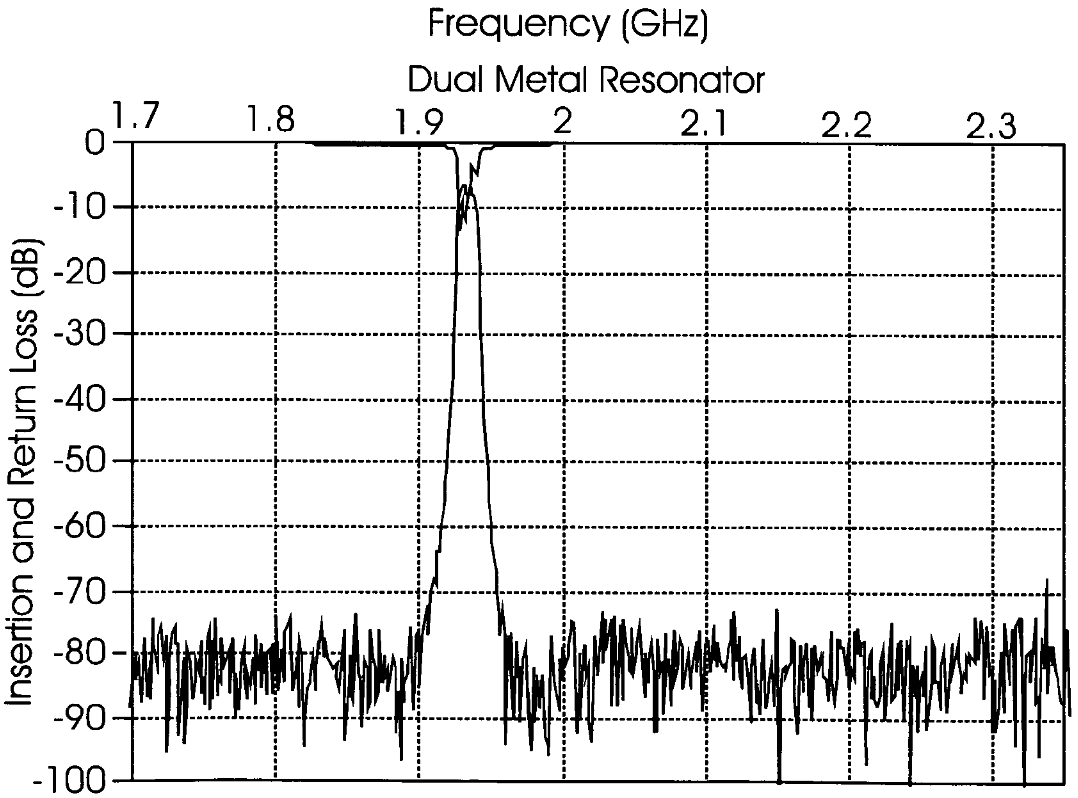
FIG. 11 is a graph of the wide band response from a 10 MHz bandwidth 8-pole filter having metallic resonators in the first and last positions (positions 1 and 8).

The design illustrated in FIG. 9 has the advantage of reduced size and lower production cost (due to reduction in size and use of two less dielectric resonators 38). FIG. 11 illustrates a graph of the wide band response from a 10 MHz bandwidth filter 18(*a*) having metallic resonators in the first and last positions (position 1 and 8). Also shown in FIG. 11 is the return loss. As seen in FIG. 11, with the hybrid filter 18)(*a*), the spurious is reduced below the −80 dB noise floor.

Figure 10:
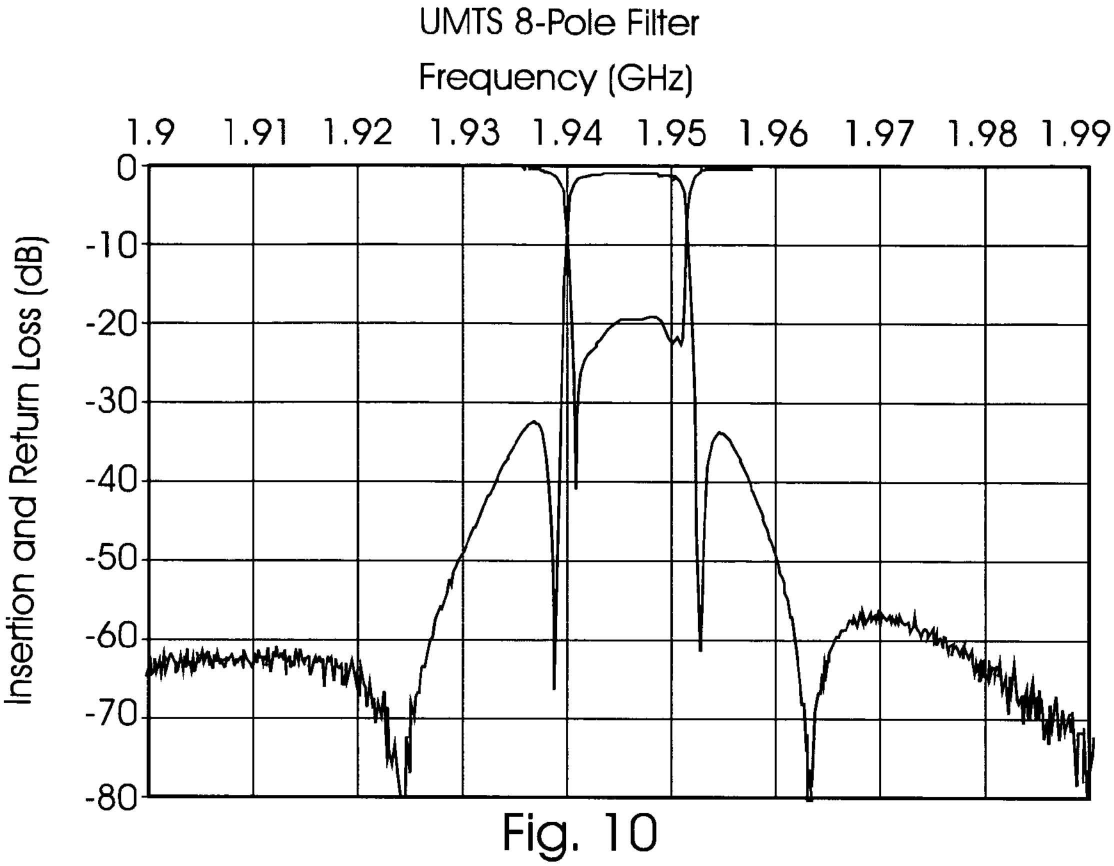
FIG. 10 illustrates the measured insertion loss response (and return loss) of a narrow band filter (e.g., less than 15 MHz) of the type illustrated in FIG. 6.

FIG. 10 illustrates the measured insertion loss response (and return loss) of a narrow band filter (e.g., less than 15 MHz) 18(*a*) of the type illustrated in FIG. 6. The filter 18(*a*) includes a 10 MHz bandwidth, eight-pole filter having four transmission zeros. The filter 18(*a*) included the clean-up filter 44 to reduce the high frequency spurious. For the filter embodiment illustrated in FIG. 9, because there is a second filter 18(*b*) after the LNA 20, a compromise can be made of the spurious attenuation (e.g., 40 dB rather than 70 dB) and the clean-up filter 44 may be optimized for the lowest possible loss. Given a maximum Q of around 1000 for the clean-up filter 44, by using a four or three pole filter 18(*a*) having a bandwidth of 200-250 MHz, the filter 18(*a*) is able to achieve about 50 dB rejection with additional band loss of 0.15 to 0.20 dB. This translates into a filter design 18(*a*) with a 0.3 dB center-band loss and 0.4 band edge loss.

In still another embodiment, a TMA 2 is provided that utilizes multi-mode dielectric-based filters (or resonators) in wireless applications. FIG. 12 illustrates one embodiment of a multi-mode, dielectric-based TMA 2 in the configuration shown in FIG. 2B which uses a total of eight (8) multi-mode dielectric filter resonators 38(*a*)-(*h*) (or pucks) pucks—four (4) for the transmit filter 16 and four (4) for the receive filter 18. Each filter design uses two modes in the dielectric resonator 38, thus giving a Tx and Rx filter comprising eight poles, or resonances. While an eight-pole configuration is shown in FIG. 12, other configurations are also contemplated by the present invention. Resonators 38(*a*), 38(*b*), 38(*c*), and 38(*d*) are used on the receive (Rx) side of the TMA 2, while resonators 38(*e*), 38(*f*), 38(*g*), and 38(*h*) are used on the transmit (Tx) side of the TMA 2. Preferably, the resonators 38(*a*)-(*h*) are made from a dielectric material having a dielectric constant of at least 20. The material used for the multi-mode, dielectric resonators 38(*a*)-(*h*) can include titanate-based, niobate-based, or tantalate(BZT)-based dielectric materials. Examples of materials usable in the multi-mode dielectric filter pucks 38(*a*)-(*h*) include Series Nos. 8300, 4300 and 4500 dielectrics available from Trans-Tech, Inc., 5520 Adamstown Road, Adamstown, Md. 21710. There are several choices for dielectric materials with the trade-offs being size (dielectric constant), rejection (Q), and cost. U.S. Pat. Nos. 4,489,293, 4,453,146, and 4,652,843 disclose the basic design of multi-mode dielectric filters. The above-identified patents are incorporated by reference as if set forth fully herein. The resonators 38(*a*)-(*h*) for dual-mode filters are preferably round in shape and mounted to a housing 30 via a low dielectric constant electrical insulator 42 such as alumina (e.g., as seen in FIG. 5). For higher mode filters, the resonators 38 will most likely not be a round cylinder.

Referring back to FIG. 12, the housing 30 includes a number of cavities or wells 32 which house the individual resonators 38(*a*)-(*h*). Irises 36 are formed between adjacent resonators 38(*a*)-38(*b*), 38(*c*)-38(*d*), 38(*e*)-38(*f*), 38(*g*) -38(*h*) as shown to permit coupling. As seen in FIG. 12, there is no iris between resonators 38(*b*) and 38(*c*) and resonators 38(*f*) and 38(*g*). In this embodiment, coupling is provided via an interconnect 37 which may include, for example, a copper wire. Alternatively, transmission zeros may be provided between filter pucks within the TMA 2. The TMA 2 includes an antenna connector or input 12 which connects to a coaxial cable feed from an antenna 6 (as seen in FIG. 1). A lightening arrestor 14 may be used to prevent or minimize damage that might arise in the event of a lightening strike, or it can be incorporated into the design of the duplexer. The TMA 2 also includes a LNA 20 for amplifying in-band signals down to the BTS 8. A Rx clean-up filter 44 is provided to clean-up spurious signals prior to transmission to the BTS 8. The TMA 2 includes an Rx output connector 24 which is coupled to a coax cable (not shown) which runs to the BTS 8 as described above.

The Tx side of the TMA 2 includes a Tx input connector 64 which is coupled to a coax cable (not shown). The Tx signal passes through the four resonators 38(*e*), 38(*f*), 38(*g*), and 38(*h*) and through a Tx clean-up filter 66. The Tx signal then passes through the common antenna connector 12.

Each of the resonators 38(*a*)-(*h*) in the TMA 2 is tunable via a plurality of associated tuning screws 68(*a*), 68(*b*), 68(*c*). The tuning screws 68(*a*)-(*c*) are preferably mounted in a cover plate or the like (not shown in FIG. 12 for sake of clarity) and can be rotated or turned to tune each individual resonator 38(*a*)-(*h*). Two of the tuning screws 68(*a*), 68(*b*) are used to tune the frequency of the modes. These screws 68(*a*), 68(*b*) are preferably mounted at 45° with respect to the center of the resonator 38. A third tuning screw 68(*c*) is used to tune intra-puck coupling. This third tuning screw 68(*c*) is preferably located between screws 68(*a*), 68(*b*) as seen in FIG. 12 and is preferably mounted in a cover plate or the like. Another set of tuning screws 70 are provided adjacent to the irises 36 to tune inter-puck coupling. Again, these tuning screws 70 are preferably mounted in a cover plate or the like.

The embodiment shown in FIG. 12 has an approximate size of 10 inches (height)×5 inches (width)×2 inches (depth). Preferably, the overall volume of the TMA 2 is less than about 155 $in^3$ and more preferably, less than about 100 $in^3$. In addition, in one aspect, the TMA 2 has better than 10 dB, and more preferably has better than 20 dB rejection (and better than 30 dB) 1 MHz from the band edge for a 10 MHz bandwidth filter. The TMA 2 can be implemented in a wireless network implementing protocols such as TDMA, CDMA, OFDM, or TDD. Preferably, the TMA 2 can be used in networks operating a frequencies exceeding 1.5 GHz, or even 2 GHz.

Figure 13:
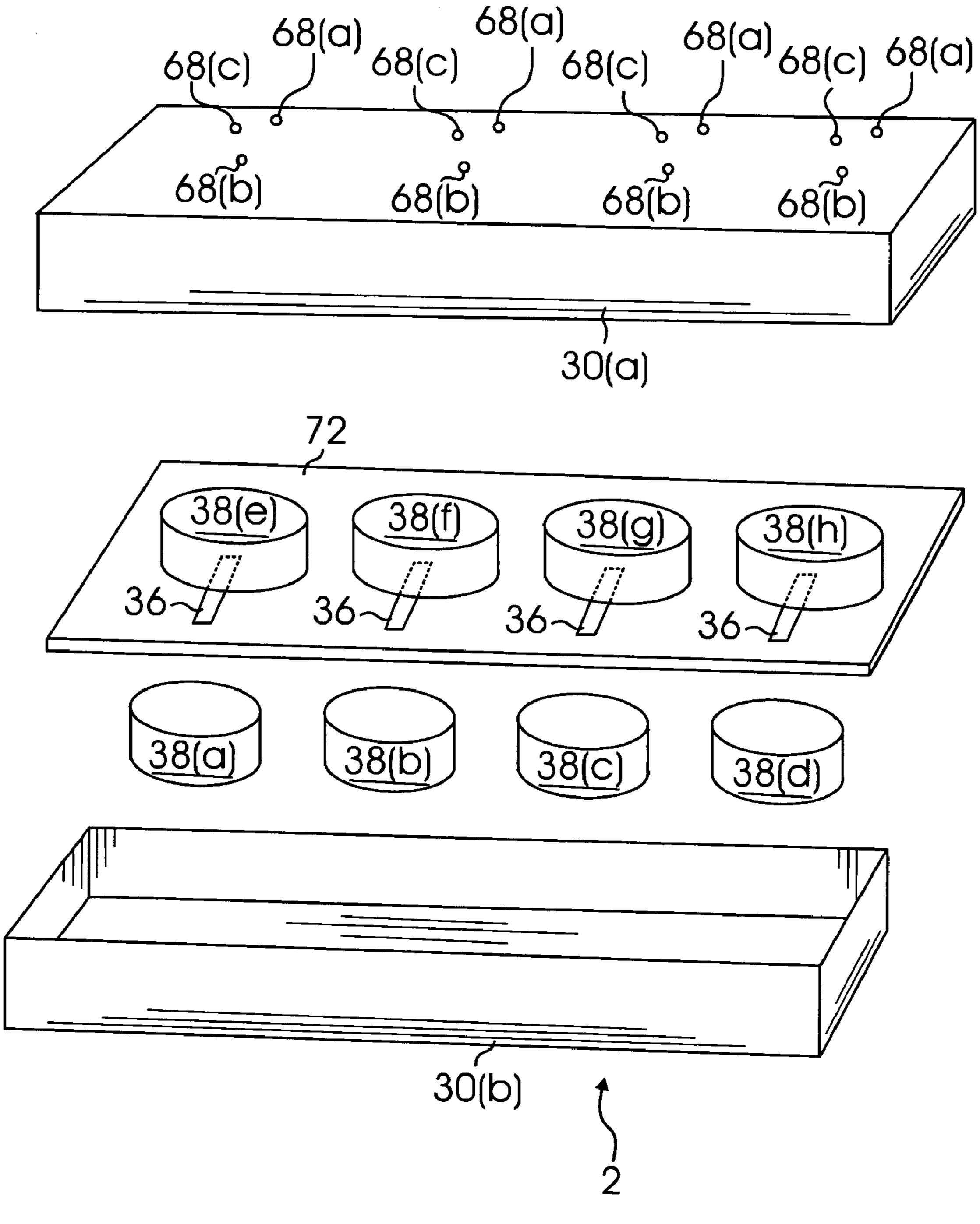
FIG. 13 illustrates an exploded view of a TMA receive filter showing the layout of the dielectric resonators and possible coupling configuration between the two "layers" according to one alternative embodiment of the invention.

FIG. 13 illustrates an exploded view of an alternative configuration of a TMA 2 in accordance with the invention. In FIG. 13, the overall size of the TMA 2 is reduced by having a facing arrangement of resonators 38(*a*)-(*h*). As seen in FIG. 13, two rows of resonators (row 1: 38(*a*), 38(*b*), 38(*c*), 38(*d*) and row 2: 38(*e*), 38a(*f*), 38(*g*), 38(*h*)) are separated by a metal plate 72 having irises 36 formed therein. The irises 36 are formed as slits or crosses depending on the what modes desired to be coupled. If no coupling is required between the facing resonators 38 then no slits will be required. The embodiment in FIG. 13 permits both face-to-face coupling as well as planar coupling between adjacent resonators 38 (e.g., resonators 38(*a*) and 38(*b*)). The resonators 38 are disposed inside a housing 30 having an upper half 30(*a*) and a lower half 30(*b*).

In this embodiment, tuning screws 68(*a*)-(*c*) are disposed in the upper and lower halves 30(*a*), 30(*b*) of the housing 30 to tune the two rows of resonators 38(*a*)-(*h*). FIG. 13 illustrates the tuning screws 68(*a*)-(*c*) only for the upper half 30(*a*).

An alternative embodiment would have the facing arrangement of resonators 38 arranged as a 2×2 square configuration.

The present invention has applicability both for TMAs, MHAs, TMBs as well as remote antenna/RF systems which includes repeaters. For remote antenna/RF systems, where the requirements for small size are the same as for TMAs, the system would include additional gain to minimize the impact on the total noise figure of the receiver, and a method to convert the signals into a form convenient to transport back to the base station 8 (either over fiber or over air). A power amplifier might also be included in this particular case. By using a combination of dielectric-based filters 18(*a*) and LNA 20 and/or power amplifier in the remote system, the receiver noise will be reduced because of the rejection from the filter and the Tx filter in the system will clean-up the spurious signals from the power amplifier. This may enable the use of pre-distortion only power amplifiers rather than the more expensive and bulky feed-forward designs.

It should also be understood that multiple RF resonator subsystems may be included in a single housing 30. For example, the housing 30 may include multiple receive filters 18 operating at differing frequencies, all of which, are contained in a single housing 30.

One benefit of the RF devices 2 described herein is that they are able to increase the coverage area of a cellular base station 8. By mounting the RF device 2 close to or at the antenna 6, the area of uplink coverage may increase in excess of 20%.

While embodiments of the present invention have been shown and described, various modifications may be made without departing from the scope of the present invention. The invention, therefore, should not be limited, except to the following claims, and their equivalents.

What is claimed is:

1. A non-actively cooled radiofrequency device adapted for coupling to an antenna comprising:
- a housing having a plurality of cavities and an input and output, the input being coupled to the antenna, the output being coupled to a base station;
- a transmission path within the housing including a transmit filter;
- a receive path within the housing including at least one receive filter and a low noise amplifier, the receive filter including a plurality of cavities, wherein the cavity closest to an input of the receive filter comprises a metal resonator and the cavity closest to an output of the receive filter comprises a metal resonator, and the remainder of cavities in the receive filter each contain a dielectric-based resonator, wherein at least one pair of non-adjacent dielectric-based resonators are coupled via a metallic element; and
- wherein the radiofreguency device is configured for mounting on a tower within five feet of the antenna and wherein the at least one receive filter exhibits a passband moving less than 100 kHz over a temperature range from −20° C. to 60° C.

2. The device of claim 1, wherein the device is used in a wireless network implementing a protocol selected from the group consisting of TDMA, CDMA, OFDM, and TDD.

3. The device of claim 1, wherein the device is located within 3 feet of the antenna.

4. The device of claim 1, wherein the radiofrequency device is integrally formed with the antenna.

5. The device of claim 1, wherein the dielectric-based resonator has a dielectric constant above 20.

6. The device of claim 1, further including a cover plate enclosing the plurality of cavities in the housing, the cover plate including a plurality of tuning members disposed adjacent to the dielectric-based resonators.

7. The device of claim 1, wherein the radiofrequency device is selected from the group consisting of a tower mounted amplifier, a mast head amplifier, and a tower mounted booster.

8. The device of claim 1, wherein the at least one receive filter includes a clean-up filter.

9. The device of claim 1, wherein the radiofrequency device has a volume of less than 155 $in^3$.

10. The device of claim 1, wherein the metallic-based resonating element comprises a cylindrical metal resonator or a rod-shaped metal resonator.

11. A method of improving the coverage of a cellular base station comprising the steps of:
- providing a non-actively cooled radiofrequency device comprising:
  - a housing having a plurality of cavities and an input and output, the input being coupled to the antenna, the output being coupled to a base station;
  - a transmission path within the housing including a transmit filter;
  - a receive path within the housing including at least one receive filter and a low noise amplifier, the receive filter including a plurality of cavities , wherein the cavity closest to an input of the at least one receive filter comprises a metal resonator and the cavity closest to an output of the at least one receive filter comprises a metal resonator, and the remainder of cavities in the receive filter each contain a dielectric-based resonator, wherein at least one pair of non-adjacent dielectric-based resonators are coupled via a metallic element, wherein the at least one receive filter exhibits a passband moving less than 100 kHz over a temperature range from −20° C. to 60° C.
- mounting the radiofrequency device on a tower, within five feet of an antenna located thereon; and
- coupling the radiofrequency device to the antenna and a base station.

12. The method of claim 11, wherein the dielectric-based resonator comprises a multi-mode dielectric filter.

13. The method of claim 11, wherein the radiofrequency device has a volume of less than 155 $in^3$.

14. The method of claim 11, wherein the radiofrequency device is integrally formed with the antenna.

15. The method of claim 11, wherein the area of coverage of uplink of the cellular base station is increased by more than 20 %.

* * * * *